US012394181B1

(12) United States Patent
Suzuki et al.

(10) Patent No.: US 12,394,181 B1
(45) Date of Patent: Aug. 19, 2025

(54) PARKING ASSIST METHOD AND PARKING ASSIST DEVICE

(71) Applicant: Nissan Motor Co., Ltd., Yokohama (JP)

(72) Inventors: Yasuhiro Suzuki, Kanagawa (JP); Muku Takeda, Kanagawa (JP); Takeshi Watanabe, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/872,231

(22) PCT Filed: Jun. 9, 2022

(86) PCT No.: PCT/JP2022/023349
§ 371 (c)(1),
(2) Date: Dec. 5, 2024

(87) PCT Pub. No.: WO2023/238344
PCT Pub. Date: Dec. 14, 2023

(51) Int. Cl.
*G06V 10/77* (2022.01)
*B60W 30/06* (2006.01)
*G06V 10/60* (2022.01)
*G06V 20/58* (2022.01)

(52) U.S. Cl.
CPC ......... *G06V 10/7715* (2022.01); *B60W 30/06* (2013.01); *G06V 10/60* (2022.01); *G06V 20/586* (2022.01); *B60W 2420/403* (2013.01)

(58) Field of Classification Search
CPC ........ G06V 10/70; G06V 10/82; G06V 20/52; G06T 11/001; G06T 15/08
See application file for complete search history.

(56) References Cited

U.S. PATENT DOCUMENTS

| | | | |
|---|---|---|---|
| 9,104,702 B2 | 8/2015 | Takahashi | |
| 10,679,072 B2 | 6/2020 | Fujita | |
| 10,953,869 B2 | 3/2021 | Iio et al. | |
| 2007/0031042 A1 | 2/2007 | Simental et al. | |
| 2010/0098290 A1* | 4/2010 | Zhang | B60W 30/00 701/41 |
| 2013/0188837 A1 | 7/2013 | Takahashi | |
| 2018/0225524 A1 | 8/2018 | Fujita | |
| 2019/0039605 A1 | 2/2019 | Iio et al. | |
| 2019/0286921 A1* | 9/2019 | Liang | G06F 16/909 |

(Continued)

FOREIGN PATENT DOCUMENTS

| | | |
|---|---|---|
| JP | 2007-215216 A | 8/2007 |
| JP | 2010-202018 A | 9/2010 |

(Continued)

*Primary Examiner* — Santiago Garcia
(74) *Attorney, Agent, or Firm* — Young Basile Hanlon & MacFarlane, P.C.

(57) ABSTRACT

In a parking assist method, a surrounding image that is a color image obtained by capturing surroundings of an own vehicle is acquired, the surrounding image is converted to a first multi-gradation image in such a way that a luminance difference between a region in which a ratio of a green component is low and a region in which the ratio of the green component is high in the surrounding image increases, a feature point is extracted from the first multi-gradation image, and a relative position of the own vehicle with respect to a target parking position is calculated based on the extracted feature point.

7 Claims, 8 Drawing Sheets (56) References Cited

U.S. PATENT DOCUMENTS

| | | | |
|---|---|---|---|
| 2020/0211375 A1* | 7/2020 | Vig | G01S 7/412 |
| 2020/0250439 A1* | 8/2020 | Vig | G05D 1/0246 |
| 2021/0101624 A1* | 4/2021 | Philbin | G06F 18/251 |
| 2023/0281981 A1* | 9/2023 | Ding | G06V 10/776 |
| | | | 382/155 |
| 2024/0118410 A1* | 4/2024 | Lin | G06V 10/454 |
| 2024/0193809 A1* | 6/2024 | Ostadabbas | G06V 40/103 |

FOREIGN PATENT DOCUMENTS

| | | |
|---|---|---|
| JP | 2017-138664 A | 8/2017 |
| JP | 2018-128314 A | 8/2018 |
| WO | 2012/046671 A1 | 4/2012 |
| WO | 2015/152304 A1 | 10/2015 |

* cited by examiner

PARKING ASSIST METHOD AND PARKING ASSIST DEVICE

TECHNICAL FIELD

The present invention relates to a parking assist method and a parking assist device.

BACKGROUND

In JP 2017-138664 A, a driving control device configured to extract a feature point from an image in which surroundings of a target parking position was captured in the past and store the feature point, calculate a relative position of the target parking position with respect to the own vehicle, based on a position of a stored target object and a position of the target object extracted from an image in which surroundings of the own vehicle is captured at the time of autonomous parking, and cause the own vehicle to autonomously move to the target parking position, based on the calculated relative position is described.

SUMMARY

When a vegetation region is included in an image obtained by capturing the surroundings of the target parking position or an image obtained by capturing the surroundings of the own vehicle, there is a risk that calculation precision of the target parking position deteriorates due to a feature point of an indistinct outline or the like being extracted in the vegetation region.

An object of the present invention is to, in parking assist to assist parking of an own vehicle at a target parking position based on a feature point extracted from a captured image, improve calculation precision of the target parking position when a vegetation region is included in the captured image.

According to an aspect of the present invention, there is provided a parking assist method for assisting parking of an own vehicle at a target parking position, the parking assist method including: extracting a feature point in surroundings of the target parking position from an image obtained by capturing surroundings of the own vehicle as a learned feature point and storing the learned feature point in a storage device, in advance; acquiring an image by capturing surroundings of the own vehicle when causing the own vehicle to move to the target parking position; extracting a feature point in surroundings of the own vehicle from an image of surroundings of the own vehicle as a surrounding feature point; calculating a relative position of the own vehicle with respect to the target parking position, based on a relative positional relationship between the learned feature point and the target parking position and a relative positional relationship between the surrounding feature point and the own vehicle; calculating a target travel trajectory starting from a current position of the own vehicle and reaching the target parking position, based on a relative position of the own vehicle with respect to the calculated target parking position and assisting the own vehicle in moving along the target travel trajectory; and when a target feature point, the target feature point being at least one the learned feature point and the surrounding feature point, is extracted: converting a surrounding image, the surrounding image being a color image obtained by capturing surroundings of the own vehicle, to a first multi-gradation image in such a way that in the surrounding image, a luminance difference between a region in which a ratio of a green component is low and a region in which a ratio of a green component is high increases; and extracting the target feature point from the first multi-gradation image.

According to an aspect of the present invention, it is possible to, in parking assist to assist parking of an own vehicle at a target parking position based on a feature point extracted from a captured image, improve calculation precision of the target parking position when a vegetation region is included in the captured image.

DETAILED DESCRIPTION (Configuration)

Figure 1:
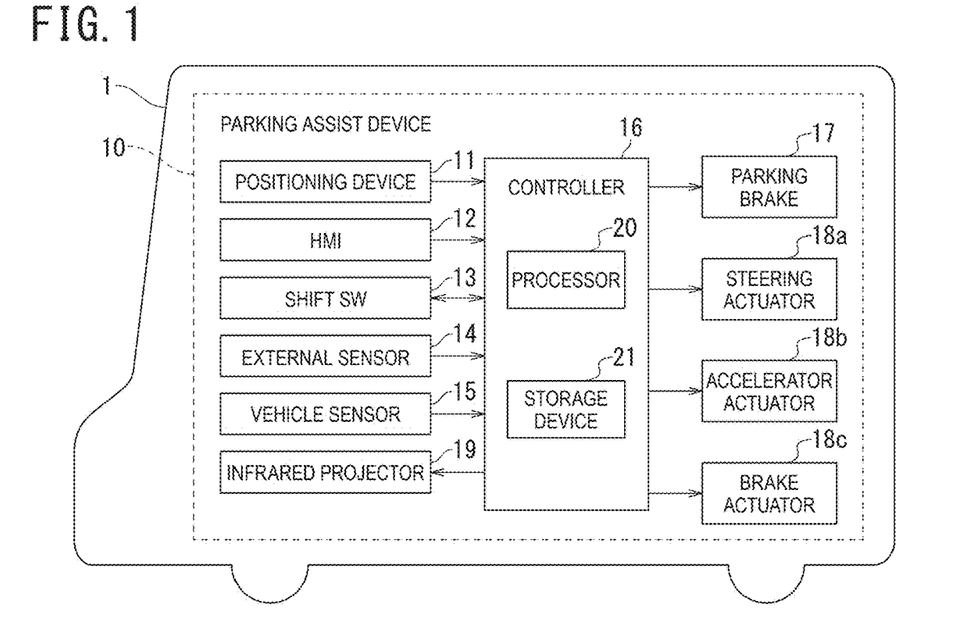
FIG. 1 is a diagram illustrative of a schematic configuration example of a parking assist device.

FIG. 1 is now referred to. An own vehicle 1 includes a parking assist device 10 configured to assist parking of the own vehicle 1 at a target parking position. The parking assist device 10 assists the own vehicle 1 in traveling along a target travel trajectory from a current position of the own vehicle 1 to the target parking position. For example, the parking assist device 10 may perform autonomous driving in which the own vehicle 1 is controlled to autonomously travel to the target parking position along the target travel trajectory of the own vehicle 1 (that is, control to cause the own vehicle 1 to control all or some of a steering angle, driving force, and braking force thereof and autonomously perform all or a portion of travel along the target travel trajectory). Alternatively, the parking assist device 10 may assist parking of the own vehicle 1 by displaying the target travel trajectory and the current position of the own vehicle 1 on a display device that a passenger of the own vehicle 1 can visually recognize.

The positioning device 11 measures the current position of the own vehicle 1. The positioning device 11 includes, for example, a global navigation satellite system (GNSS) receiver. Human-machine interfaces (HMIs) 12 are interface devices between the parking assist device 10 and the passenger and include the display device, a speaker, a buzzer, and an operation element. A shift switch (shift SW) 13 is a switch for a driver or the parking assist device 10 to switch a shift position. External sensors 14 detect an object existing in a predetermined distance range from the own vehicle 1. The external sensors 14 detect a surrounding environment of the own vehicle 1, such as a relative position between an object existing in surroundings of the own vehicle 1 and the own vehicle 1, distance between the own vehicle 1 and the object, and a direction in which the object exists. The external sensors 14 may include, for example, a camera to capture an image of the surrounding environment of the own vehicle 1. To cope with parking assist of the own vehicle 1 in an environment in which illuminance around the own vehicle 1 is less than a predetermined threshold value (for example, at night), a camera for day and night use that is capable of capturing an image in both a visible light region and an infrared region may be employed as the camera included in the external sensors 14. A camera for daytime use capable of capturing an image in the visible light region and a camera capable of capturing an image in the infrared region may be individually included in the external sensors 14. In the present embodiment, an example of a case where a camera for day and night use is employed will be described. Hereinafter, the camera in the external sensors 14 is simply referred to as "camera". The external sensors 14 may include a ranging device, such as a laser range finder, a radar, and a LiDAR. The vehicle sensors 15 detect various information (vehicle information) about the own vehicle 1. The vehicle sensors 15 may include, for example, a vehicle speed sensor, wheel speed sensors, a triaxial acceleration sensor (G sensor), a steering angle sensor, a turning angle sensor, a gyro sensor, and a yaw rate sensor.

The controller 16 is an electronic control unit that performs parking assist control of the own vehicle 1. The controller 16 includes a processor 20 and peripheral components, such as a storage device 21. The storage device 21 may include a semiconductor storage device, a magnetic storage device, an optical storage device, or the like. Functions of the controller 16 may be achieved by, for example, the processor 20 executing computer programs stored in the storage device 21. A steering actuator 18a controls steering direction and the amount of steering of a steering mechanism in accordance with a control signal from the controller 16. An accelerator actuator 18b controls accelerator opening of a drive device (an engine or a drive motor) in accordance with a control signal from the controller 16. A brake actuator 18c causes a braking device to operate in accordance with a control signal from the controller 16.

An infrared projector 19 irradiates the surroundings of the own vehicle 1 with infrared light in accordance with a control signal from the controller 16 when the parking assist device 10 assists parking of the own vehicle 1 in an environment in which the illuminance around the own vehicle 1 is less than the predetermined threshold value. For example, the infrared projector may be infrared light-emitting diodes that are installed on the left-hand side and right-hand side of the own vehicle 1, radiate infrared light obliquely downward on each of the left and right lateral sides of the own vehicle 1, and irradiate nearby road surfaces on the left and right lateral sides of the own vehicle 1 with infrared light.

Figure 2A:
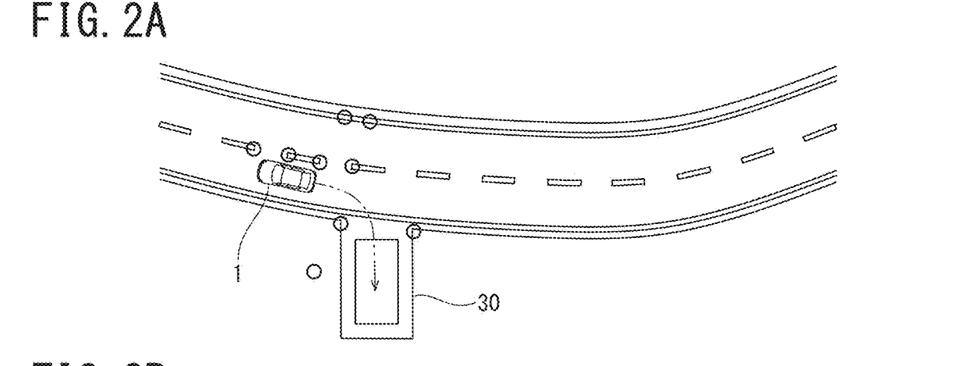
FIG. 2A is an explanatory diagram of an example of processing of storing a learned feature point.

Next, the parking assist control performed by the parking assist device 10 will be described. FIG. 2A is now referred to. When the parking assist performed by the parking assist device 10 is used, the parking assist device 10 extracts a feature point from an image obtained by capturing surroundings of a target parking position 30 that is a position at which the own vehicle 1 is to be parked, and causes the storage device 21 to store the extracted feature point in advance. Hereinafter, a feature point stored in the storage device 21 is referred to as "learned feature point". In FIG. 2A, circular marks represent learned feature points. For example, the parking assist device 10 extracts feature points in the surroundings of the target parking position 30 from a surrounding image that is obtained by capturing the surroundings of the own vehicle 1 by the camera when the own vehicle 1 is positioned in a vicinity of the target parking position 30 (for example, when the own vehicle 1 is to be parked at the target parking position 30 by manual driving). For example, the parking assist device 10 detects, as a feature point, an edge point at which luminance changes between adjacent pixels by a predetermined amount or more or a point having a characteristic shape, such as an edge and a corner of a target object like a pavement marking, a road boundary, an obstacle, or the like, in a captured image captured by the camera. When the learned feature points are to be stored in the storage device 21, for example, the driver operates a "parking position learning switch" that is prepared as an operation element in the HMIs 12. Note that when the illuminance around the own vehicle 1 is less than the predetermined threshold value, learned feature points are extracted from a captured image obtained by capturing the image while the infrared projector 19 irradiates the surroundings of the own vehicle 1 with infrared light.

The parking assist device 10 stores a relative positional relationship between a learned feature point and the target parking position 30. For example, the driver may input a fact that the own vehicle 1 is positioned at the target parking position 30, through an HMI 12. The parking assist device 10 may calculate a relative positional relationship between a learned feature point and the target parking position 30, based on a position of a learned feature point that is detected when the own vehicle 1 is positioned at the target parking position 30. For example, the parking assist device 10 may store coordinates of a learned feature point and the target parking position 30 in a coordinate system with a fixed point as a reference point (hereinafter, referred to as "map coordinate system"). In this case, the parking assist device 10 may store a current position in the map coordinate system that the parking assist device 10 measures using the positioning device 11 when the own vehicle 1 is positioned at the target parking position 30, as the target parking position 30. Alternatively, the parking assist device 10 may store a relative position of the target parking position 30 with respect to each learned feature point in place of a position in the map coordinate system.

Figure 2B:
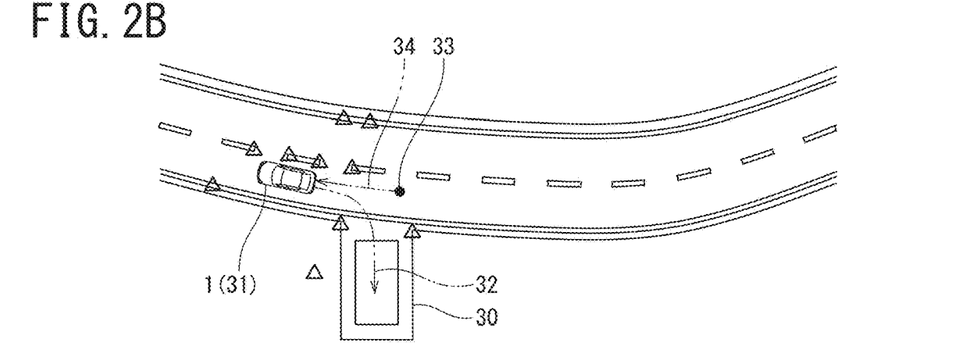
FIG. 2B is an explanatory diagram of an example of processing performed when parking assist is performed.

FIG. 2B is an explanatory diagram of an example of processing performed when the parking assist is performed. The parking assist device 10 performs the parking assist of the own vehicle 1 when the own vehicle 1 is positioned in the vicinity of the target parking position 30. For example, the parking assist device 10 determines whether or not the driver performs a shift operation for turnabout to switch forward movement and backward movement of the own vehicle 1 when the own vehicle 1 is positioned in the vicinity of the target parking position 30. A reference sign 31 denotes a turnabout position. The parking assist device 10 may determine that a shift operation for turnabout is performed when the shift position is changed from a drive range (D range) to a reverse range (R range) or changed from the R range to the D range, and start the parking assist. When the own vehicle 1 is positioned at a position 33 in the vicinity of the target parking position 30 and the driver operates a "parking assist activation switch" that is prepared in the HMIs 12, the parking assist device 10 may start the parking assist.

The parking assist device 10 extracts a feature point in the surroundings of the own vehicle 1 from a surrounding image that is obtained by capturing the surroundings of the own vehicle 1 with the camera. Hereinafter, a feature point in the surroundings of the own vehicle 1 that is extracted when the parking assist is performed is referred to as "surrounding feature point". In FIG. 2B, triangular marks represents surrounding feature points.

Note that when the illuminance around the own vehicle 1 is less than the predetermined threshold value when the parking assist is performed, the parking assist device 10 extracts a surrounding feature point from a captured image obtained by capturing the image with the camera while the infrared projector 19 irradiates the surroundings of the own vehicle 1 with infrared light.

The parking assist device 10 matches and compares a learned feature point stored in the storage device 21 and a surrounding feature point with each other and associates the same feature points with each other.

The parking assist device 10 calculates a relative position of the own vehicle 1 with respect to the target parking position 30, based on a relative positional relationship between a surrounding feature point detected when the parking assist is performed and the own vehicle 1 and a relative positional relationship between a learned feature point associated with the surrounding feature point and the target parking position 30. For example, the parking assist device 10 may calculate a position of the target parking position 30 in a coordinate system with reference to the current position of the own vehicle 1 (hereinafter, referred to as "vehicle coordinate system"). For example, when coordinates of a learned feature point and the target parking position 30 in the map coordinate system are stored in the storage device 21, the parking assist device 10 may convert the coordinates of the target parking position 30 in the map coordinate system to coordinates of the target parking position 30 in the vehicle coordinate system, based on a position of a surrounding feature point detected when the parking assist is performed and the position of the learned feature points in the map coordinate system. Alternatively, the parking assist device 10 may calculate the current position of the own vehicle 1 in the map coordinate system, based on the position of the surrounding feature point detected when the parking assist is performed and the position of the learned feature point in the map coordinate system, and calculate the relative position of the own vehicle 1 with respect to the target parking position 30 from a difference between the coordinates of the own vehicle 1 and the coordinates of the target parking position 30 in the map coordinate system. The parking assist device 10 calculates a target travel trajectory starting from the current position of the own vehicle 1 and reaching the target parking position 30, based on the relative position of the own vehicle 1 with respect to the target parking position 30. For example, when the position of the own vehicle 1 at a time point when the parking assist is started is the turnabout position 31, the parking assist device 10 calculates a trajectory 32 starting from the turnabout position 31 and reaching the target parking position 30. In addition, for example, when the position of the own vehicle 1 at a time point when the parking assist is started is the position 33 in the vicinity of the target parking position 30, the parking assist device 10 calculates a trajectory 34 starting from the position 33 and reaching the turnabout position 31 and the trajectory 32 starting from the turnabout position 31 and reaching the target parking position 30. The parking assist device 10 performs parking assist control of the own vehicle 1, based on the calculated target travel trajectory.

Figure 3:
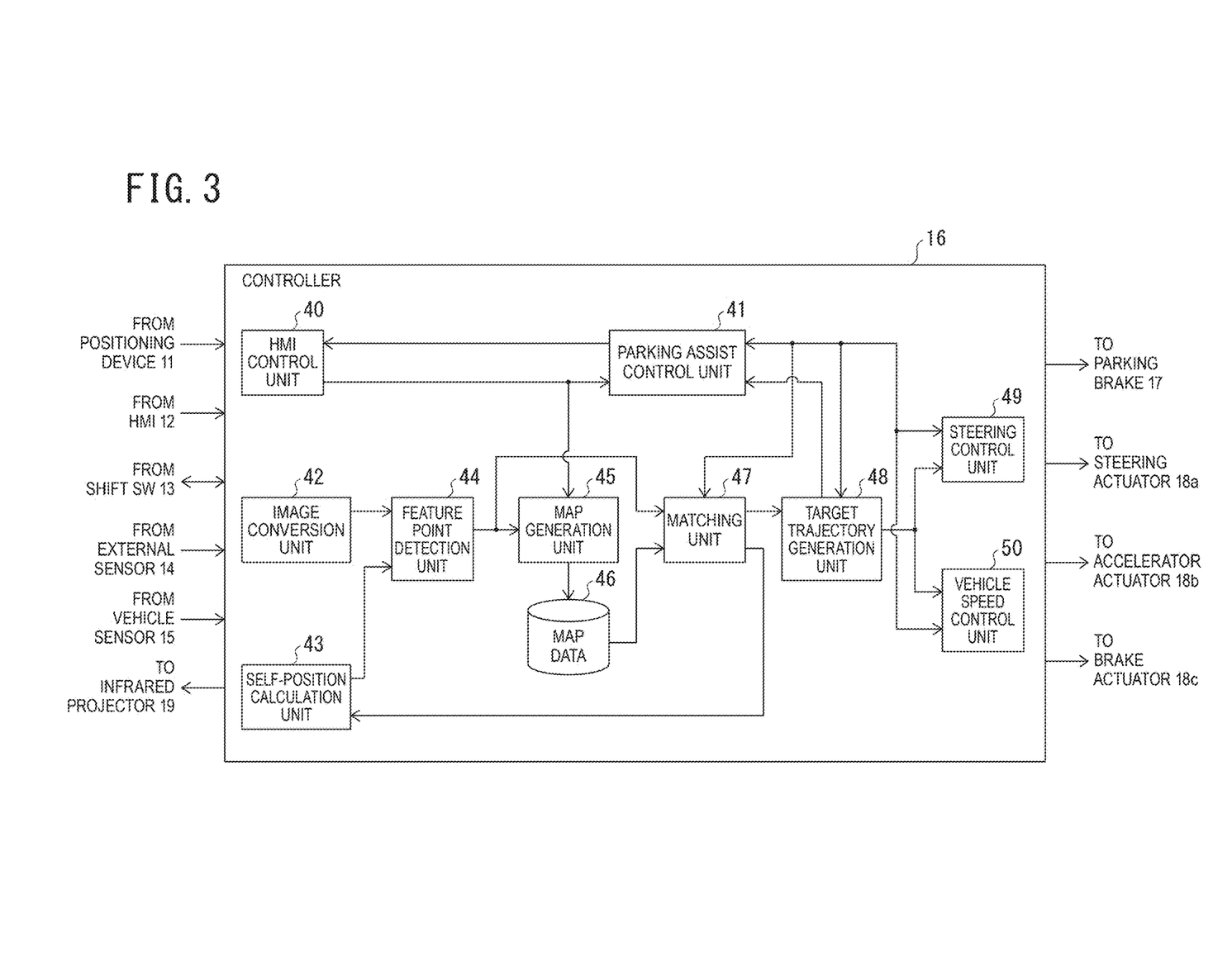
FIG. 3 is a block diagram of an example of a functional configuration of a controller in FIG. 1.

A functional configuration of the controller 16 is illustrated in FIG. 3. A human-machine interface control unit (HMI control unit) 40 outputs a map generation command to cause a learned feature point to be stored in the storage device 21 to a map generation unit 45 when the parking position learning switch is operated. The HMI control unit 40 determines whether or not the driver performs a shift operation for turnabout and whether or not the parking assist activation switch is operated, and outputs a determination result to a parking assist control unit 41. The parking assist control unit 41 determines whether or not the own vehicle 1 is positioned in the vicinity of the stored target parking position 30. For example, the parking assist control unit 41 determines whether or not distance between the own vehicle 1 and the target parking position 30 is less than or equal to a predetermined distance. When the own vehicle 1 is positioned in the vicinity of the target parking position 30 and the parking assist control unit 41 detects the parking assist activation switch being operated or a shift operation for turnabout being performed, the parking assist control unit 41 sets the stored target parking position 30 as the target parking position 30 in the parking assist control and starts the parking assist control.

When the parking assist control unit 41 starts the parking assist control, the parking assist control unit 41 outputs a parking position calculation command to cause the position of the target parking position 30 in the vehicle coordinate system to be calculated to a matching unit 47. In addition, the parking assist control unit 41 outputs a travel trajectory calculation command to cause a target travel trajectory and a target vehicle speed profile in accordance with which the own vehicle 1 travels the target travel trajectory to be calculated to a target trajectory generation unit 48. The target trajectory generation unit 48 calculates a target travel trajectory starting from the current position of the own vehicle 1 and reaching the target parking position 30 and a target vehicle speed profile and outputs the calculated target travel trajectory and target vehicle speed profile to the parking assist control unit 41. To calculation of the target travel trajectory, a well-known method that is employed for an automated parking device can be applied. For example, the target travel trajectory can be calculated by connecting the current position of the own vehicle 1 to the target parking position 30 by way of the turnabout position 31 with clothoid curves. In addition, for example, the target vehicle speed profile may be a vehicle speed profile that causes the own vehicle 1 to accelerate to a predetermined set speed from the current position of the own vehicle 1 and subsequently decelerate before reaching the turnabout position 31 and come to a stop at the turnabout position 31, and accelerate to the set speed from the turnabout position 31, decelerate before reaching the target parking position 30, and come to a stop at the target parking position 30.

The parking assist control unit 41 outputs the target travel trajectory and information about the current position of the own vehicle 1 to the HMI control unit 40. When the target travel trajectory includes a turnabout position, the parking assist control unit 41 outputs information about the turnabout position to the HMI control unit 40. The HMI control unit 40 displays the target travel trajectory, the current position of the own vehicle 1, and the turnabout position on an HMI 12.

In addition, the parking assist control unit 41 outputs a steering control command to control steering in such a way as to cause the own vehicle 1 to travel along the calculated target travel trajectory to a steering control unit 49. In addition, the parking assist control unit 41 outputs a vehicle speed control command to control vehicle speed of the own vehicle 1 in accordance with the calculated target vehicle speed profile to a vehicle speed control unit 50. An image conversion unit 42 converts a captured image captured by the camera to an overhead image (an around view monitoring image) that is an image viewed from a virtual viewpoint directly above the own vehicle 1. The image conversion unit 42 generates a surrounding image as illustrated in FIGS. 2A and 2B by converting a captured image to an overhead image at a predetermined interval (for example, every time the own vehicle 1 travels a predetermined distance (for example, 50 cm) or travels for a predetermined time (for example, for one second)) and accumulating converted overhead images along a travel route of the own vehicle 1. A self-position calculation unit 43 calculates the current position of the own vehicle 1 in the map coordinate system by dead reckoning based on vehicle information output from the vehicle sensors 15.

When a feature point detection unit 44 stores a learned feature point in the storage device 21, the feature point detection unit 44 detects a learned feature point and an image feature amount of the learned feature point from a surrounding image output from the image conversion unit 42. When the parking assist control is performed, the feature point detection unit 44 detects a surrounding feature point and an image feature amount of the surrounding feature point. Hereinafter, a learned feature point and a surrounding feature point are sometimes collectively referred to as "feature point". The feature point detection unit 44 detects a feature point and an image feature amount of the feature point from a surrounding image output from the image conversion unit 42. For detection of a feature point and calculation of an image feature amount, various methods, such as SIFT, SURF, ORB, BRIAK, KAZE, and AKAZE, can be made use of.

In a surrounding image of the own vehicle 1, a vegetation region (that is, a region in which plants have grown) is sometimes included. There are some cases where in the vegetation region, a luminance difference is generated between a portion irradiated with light and a shadow portion not irradiated with light and a feature point having a minuscule size and an indistinct outline is extracted. Since a shadow of leaves of a plant changes due to a light source (for example, the sun), there is a risk that calculation precision of the target parking position deteriorates.

In addition, in general, an image captured without radiating infrared light in an environment in which the illuminance around the own vehicle 1 is greater than or equal to the predetermined threshold value (for example, a daytime) has a characteristic that luminance of a vegetation region is lower than luminance of asphalt, and an image captured with infrared light radiated has a characteristic that the luminance of the vegetation region is higher than the luminance of asphalt. Therefore, when one of a learned feature point and a surrounding feature point is extracted from an image captured with infrared light radiated and the other of the learned feature point and the surrounding feature point is extracted from an image captured without radiating infrared light, there is a risk that the calculation precision of the target parking position deteriorates.

Accordingly, when the parking assist device 10 of the embodiment extracts a learned feature point or a surrounding feature point from an image captured without irradiating the surroundings of the own vehicle 1 with infrared light in an environment in which the illuminance around the own vehicle 1 is greater than or equal to the predetermined threshold value, the parking assist device 10 converts a surrounding image to a colorless multi-gradation image in such a way that in a color surrounding image obtained by capturing the surroundings of the own vehicle 1, a luminance value in a region in which a ratio of a green component is high increases to a higher value than a luminance value in a region in which the ratio of the green component is low, and extracts a feature point from the converted multi-gradation image.

For example, the parking assist device 10 may convert a surrounding image to a multi-gradation image in such a way that a luminance value in the region in which the ratio of the green component is high is saturated (that is, the luminance value reaches an image luminance upper limit).

As described above, since a vegetation region in a color surrounding image is a region in which the ratio of the green component is high, a luminance difference between a portion in which plants are irradiated with light and a shadow portion in which plants are not irradiated with light can be reduced by increasing a luminance value in the region in which the ratio of the green component is high. Since as a result, an indistinct outline feature point is less likely to be extracted in the vegetation region, the calculation precision of the target parking position can be improved. In addition, the luminance of the vegetation region can be made higher than luminance of an asphalt region in the image captured without radiating infrared light. Since because of this capability, luminance characteristics of the vegetation region and the asphalt region come to resemble each other between the image captured without radiating infrared light and the image captured with infrared light radiated, the calculation precision of the target parking position can be improved.

A detection method of a feature point by the feature point detection unit 44 will be described below in detail. In an environment in which the illuminance around the own vehicle 1 is greater than or equal to the predetermined threshold value, the feature point detection unit 44 extracts a feature point from a surrounding image captured without radiating infrared light.

In order to reduce a luminance difference between a portion in which plants are irradiated with light and a shadow portion in which plants are not irradiated with light, the feature point detection unit 44 converts the surrounding image to a multi-gradation image in such a way that a luminance value in a region in which the ratio of the green component is high increases to a higher value than a luminance value in a region in which the ratio of the green component is low, in the color surrounding image. The multi-gradation image is an example of a "first multi-gradation image" described in the claims.

As a first method, a surrounding image may be converted to a multi-gradation image in such a way that a luminance value in the region in which the ratio of the green component is high increases. For example, the feature point detection unit 44 converts a color surrounding image to a multi-gradation image in such a way that, based on a ratio of at least two color components including, of an R component (red component) Cr, a G component (green component) Cg, and a B component (blue component) Cb in the color surrounding image, the G component Cg, a luminance value of each pixel in a region in which a ratio of the G component (green component) Cg is higher than a predetermined value is saturated (that is, the luminance value reaches the image luminance upper limit). Note that a luminance value in the region in which the ratio of Cg is higher than the predetermined value may be increased based on, instead of the image luminance upper limit, a ratio of two color components.

As a second method, (1) a grayscale image (equivalent to a second multi-gradation image) of a surrounding image is generated, (2) the surrounding image is converted to a first intermediate image in such a way that a luminance value in a vegetation region decreases, (3) a second intermediate image is generated based on a luminance difference between the grayscale image and the first intermediate image, and (4) luminance of the second intermediate image is inverted. Through the processes (1) to (4), a colorless multi-gradation image in which a luminance value in the region in which the ratio of the green component is high has increased to a higher value than a luminance value in the region in which the ratio of the green component is low is obtained.

First, the feature point detection unit 44 generates a grayscale image of a surrounding image by applying ordinary (general) grayscale conversion to the surrounding image that is a color image.

Figure 4:
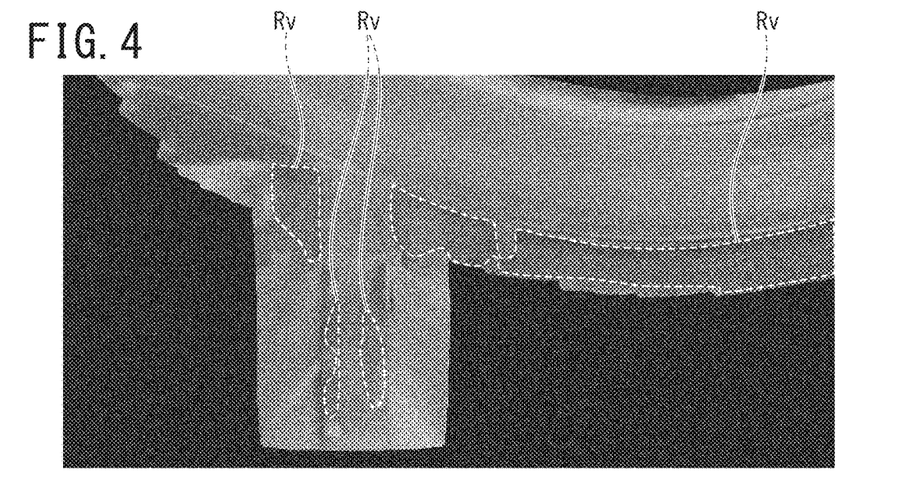
FIG. 4 is a diagram illustrative of an example of a grayscale image generated from a surrounding image when illuminance around an own vehicle is greater than or equal to a predetermined threshold value.

FIG. 4 is a diagram illustrative of an example of a grayscale image. For example, the feature point detection unit 44 may determine a luminance value of each pixel in the grayscale image by weighted-combining an R component Cr, a G component Cg, and a B component Cb of a corresponding pixel in the color surrounding image, using predetermined weighting coefficients. The grayscale image is an example of a "second multi-gradation image" described in the claims. Regions Rv enclosed by dashed lines indicate vegetation regions. An image captured without irradiating the surroundings of the own vehicle 1 with infrared light has a characteristic that the luminance of the vegetation regions Rv is lower than the luminance of the asphalt region in the surroundings of the vegetation regions Rv.

Figure 5:
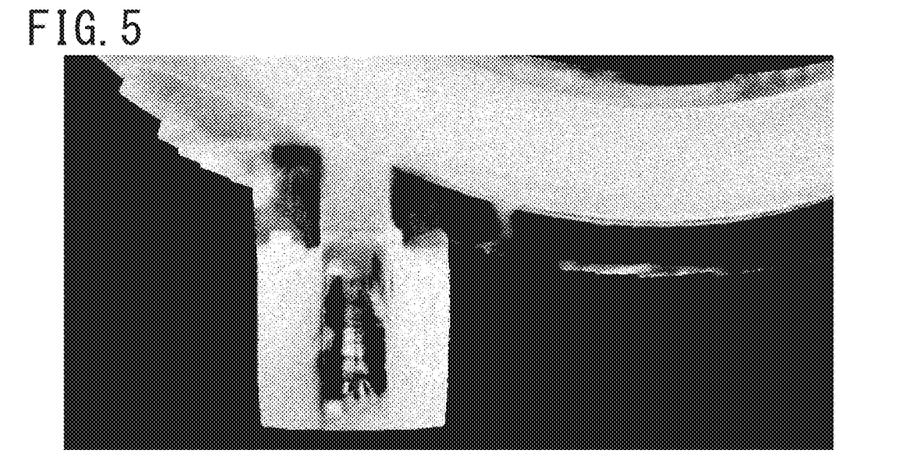
FIG. 5 is a diagram illustrative of an example of a first intermediate image generated from the surrounding image when the illuminance around the own vehicle is greater than or equal to the predetermined threshold value.

Next, the feature point detection unit 44 converts the color surrounding image to a first intermediate image that is a colorless multi-gradation image. On this occasion, the feature point detection unit 44 converts the surrounding image to the first intermediate image in such a way that in the surrounding image, a luminance value in the vegetation regions in which the ratio of the G component Cg is high is reduced to a lower value than a luminance value in a region in which the ratio of the G component Cg is low.

FIG. 5 is a diagram illustrative of an example of the first intermediate image. For example, the feature point detection unit 44 may generate the first intermediate image, based on a ratio of at least two color components including the G component Cg of the R component Cr, the G component Cg, and the B component Cb at each pixel in the surrounding image. For example, when a maximum value of each of the R component Cr, the G component Cg, and the B component Cb is 255, the feature point detection unit 44 may determine a luminance value Ck of each pixel in the first intermediate image, based on the equations (1) and (2) below.

[Math 1]

$$k = 2.0 - \frac{\frac{Cg}{255}}{\frac{Cb}{255}} \quad (1)$$

$$Ck = \begin{cases} 0, & k \leq 0 \\ k \times \text{LUMINANCE UPPER LIMIT} & 0 < k < 1 \\ \text{LUMINANCE UPPER LIMIT}, & k \geq 1 \end{cases} \quad (2)$$

Note that in the above equation, the B component Cb may be replaced by the R component Cr.

Figure 6:
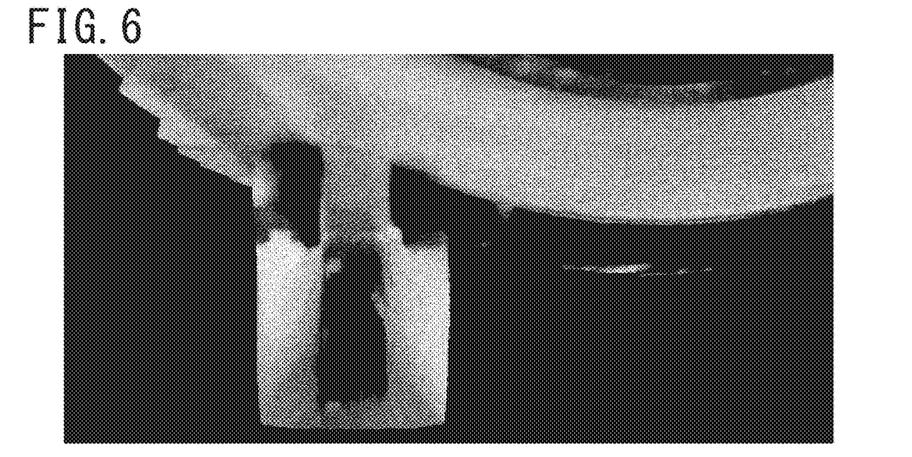
FIG. 6 is a diagram illustrative of an example of a second intermediate image.

Next, the feature point detection unit 44 generates a second intermediate image, based on a luminance difference between the grayscale image in FIG. 4 and the first intermediate image in FIG. 5. For example, the feature point detection unit 44 generates a difference image obtained by subtracting a luminance value of each pixel in the grayscale image from a luminance value of a corresponding pixel in the first intermediate image, as a second intermediate image. FIG. 6 is a diagram illustrative of an example of the second intermediate image. By subtracting a luminance value of each pixel in the grayscale image from a luminance value of a corresponding pixel in the first intermediate image, a luminance difference in a region other than the vegetation regions Rv (for example, the asphalt region) is reduced in the second intermediate image.

Figure 7:
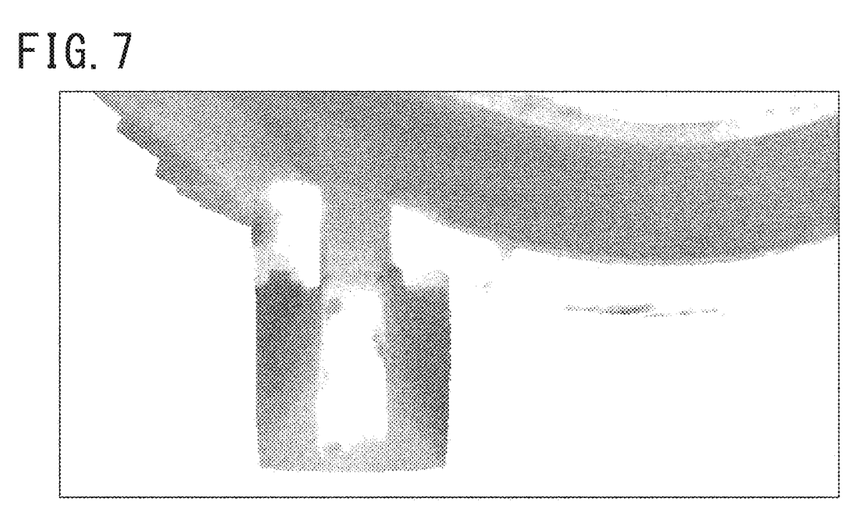
FIG. 7 is a diagram illustrative of an example of a multi-gradation image obtained by a second method.

Next, the feature point detection unit 44 generates a colorless multi-gradation image in which a luminance value in the region in which the ratio of the green component is high has increased to a higher value than a luminance value in the region in which the ratio of the green component is low, by inverting the luminance of the second intermediate image. FIG. 7 is a diagram illustrative of an example of the multi-gradation image obtained by the second method. In the image in FIG. 7, the vegetation regions Rv become bright in a substantially uniform manner (luminance becomes high in a substantially uniform manner), and the regions other than the vegetation regions Rv (for example, the asphalt region) become dark in a substantially uniform manner (luminance becomes low in a substantially uniform manner).

As a third method, using the multi-gradation image obtained by the second method (an inverted luminance image of the second intermediate image) as a third intermediate image, a multi-gradation image is generated by calculating a weighted average of each pixel value in the third intermediate image and a corresponding pixel value in the grayscale image.

Figure 8:
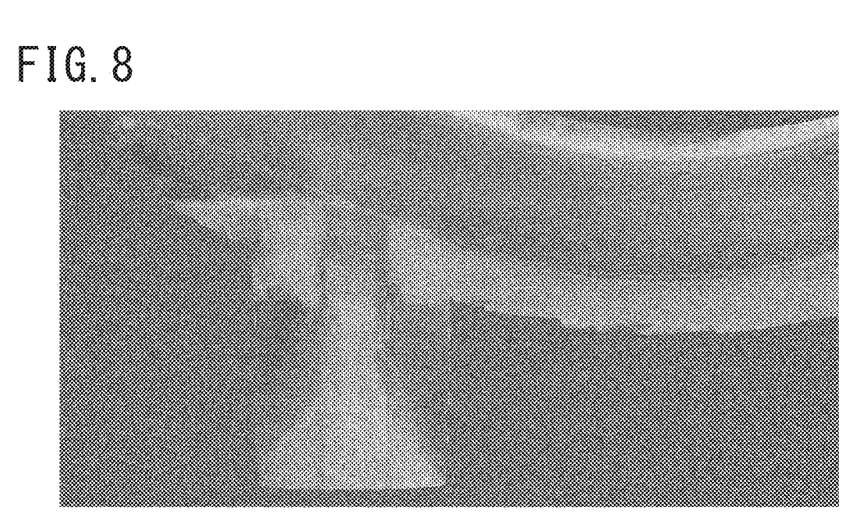
FIG. 8 is a diagram illustrative of an example of a multi-gradation image obtained by a third method.

FIG. 8 is a diagram illustrative of an example of the multi-gradation image obtained by the third method. Adding a pixel value in the third intermediate image causes a luminance value in the vegetation regions Rv to increase to a higher value than a luminance value in the other region.

Figure 9A:
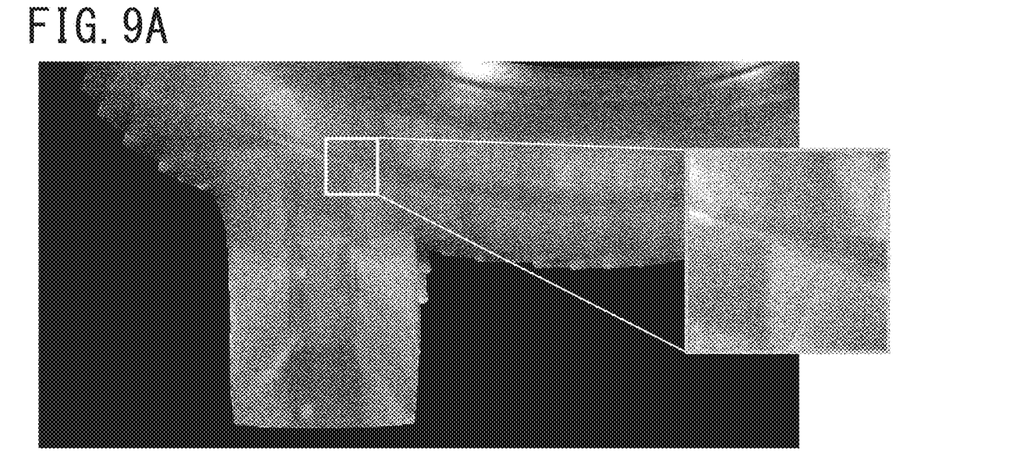
FIG. 9A is a diagram illustrative of an example of a grayscale image generated from a surrounding image when the illuminance around the own vehicle is less than the predetermined threshold value and a partially enlarged image.

In contrast, in an environment in which the illuminance around the own vehicle 1 is less than the predetermined threshold value, the feature point detection unit 44 extracts a feature point from a surrounding image captured when infrared light is radiated by the infrared projector 19. In this case, the feature point detection unit 44 generates a grayscale image of the surrounding image by applying ordinary grayscale conversion to the surrounding image that is a color image. The feature point detection unit 44 extracts a feature point from the grayscale image. FIG. 9A illustrates an example of the grayscale image of the surrounding image captured with infrared light radiated and an enlarged image of a boundary portion between a vegetation region Rv and the asphalt region. In the image captured with infrared light radiated, the luminance of the vegetation regions Rv is higher than the luminance of the asphalt region.

Figure 9B:
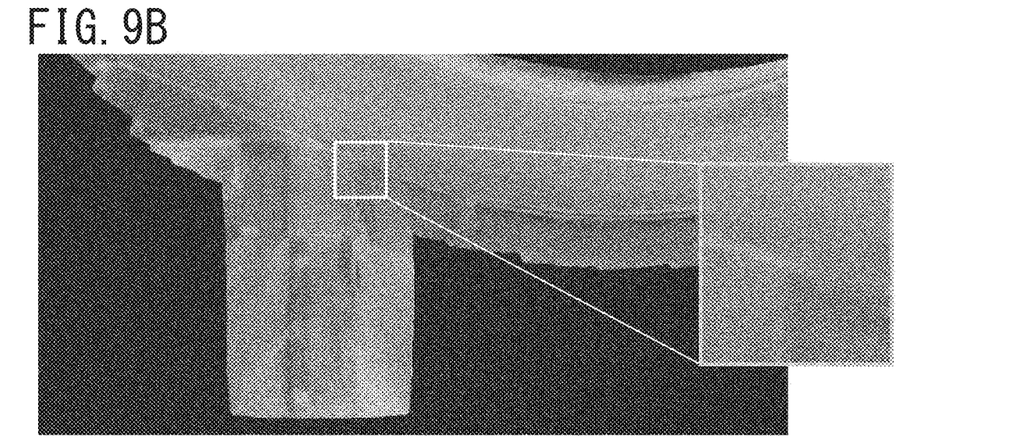
FIG. 9B is a diagram illustrative of the grayscale image in FIG. 4 and a partially enlarged image.

FIG. 9B is a diagram illustrative of a grayscale image of the surrounding image captured without radiating infrared light (the grayscale image in FIG. 4) and a partially enlarged image. In the image captured without radiating infrared light, the luminance of the vegetation regions Rv is lower than the luminance of the asphalt region, differing from the image captured with infrared light radiated.

Figure 9C:
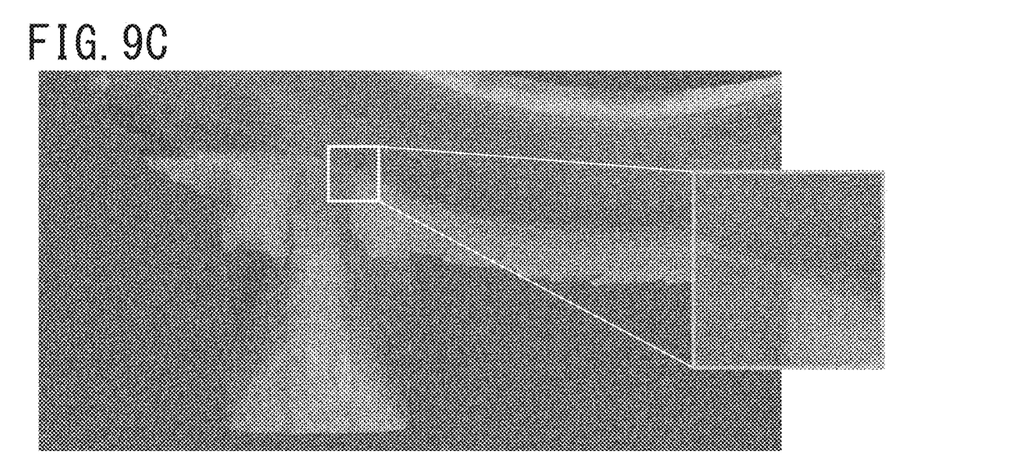
FIG. 9C is a diagram illustrative of the multi-gradation image in FIG. 8 and a partially enlarged image.

FIG. 9C is a diagram illustrative of a multi-gradation image generated in such a way that a luminance value in the vegetation regions Rv increases to a higher value than a luminance value in the other region (the multi-gradation image in FIG. 8) and a partially enlarged image. In the multi-gradation image in FIG. 9C, the luminance of the vegetation regions Rv is higher than the luminance of the asphalt region, and luminance characteristics of the vegetation regions Rv and the asphalt region can be made similar to luminance characteristics in the grayscale image when infrared light is radiated (FIG. 9A).

FIG. 3 is now referred to. When a learned feature point is to be stored in the storage device 21, the driver operates the parking position learning switch and parks the own vehicle 1 at the target parking position by manual driving. The map generation unit 45 receives a map generation command from the HMI control unit 40. The map generation unit 45 stores feature point information including a feature point output from the feature point detection unit 44, the current position of the own vehicle 1 synchronized with the output of the feature point, and a feature amount of the feature point in the storage device 21 as a learned feature point and generates map data 46. The map generation unit 45 may calculate a position of a feature point in the map coordinate system, based on the current position of the own vehicle 1 and store the calculated position of the feature point as feature point information.

In addition, when the driver inputs a fact that the current position of the own vehicle 1 is the target parking position 30 to the parking assist device 10, the map generation unit 45 receives the current position of the own vehicle 1 in the map coordinate system from the positioning device 11 or the self-position calculation unit 43 and stores the current position in the map data 46 as the target parking position 30. That is, the map generation unit 45 stores relative positional relationships between the target parking position 30 and a plurality of feature points as the map data 46.

When subsequently, the parking assist control unit 41 starts the parking assist control, the matching unit 47 receives a parking position calculation command from the parking assist control unit 41.

The matching unit 47 matches the feature point information stored in the map data 46 as a learned feature point with feature point information of a surrounding feature point output from the feature point detection unit 44 when the parking assist is performed, and associates pieces of feature point information of the same feature points with each other.

The matching unit 47 calculates a current relative position of the own vehicle 1 with respect to the target parking position 30, based on a relative positional relationship between a surrounding feature point and the own vehicle 1 and a relative positional relationship between a learned feature point associated with the surrounding feature point and the target parking position 30. For example, surrounding feature points are denoted by $(x_i, y_i)$, and learned feature points each of which is associated with one of the surrounding feature points $(x_i, y_i)$ are denoted by $(x_{mi}, y_{mi})$ (i=1 to N). The matching unit 47 calculates an affine transformation matrix $M_{affine}$, using the following equation, based on a least-square method.

[Math 2]

$$\begin{bmatrix} a_1 \\ a_2 \\ a_3 \\ a_4 \end{bmatrix} = [X_X^T X_X]$$

Where $$X_X = \begin{bmatrix} x_{m1} & y_{m1} & 1 & 0 \\ y_{m1} & -x_{m1} & 0 & 1 \\ \vdots & \vdots & \vdots & \vdots \\ x_{mN} & y_{mN} & 1 & 0 \\ y_{mN} & -x_{mN} & 0 & 1 \end{bmatrix} \quad X_{tfm} = \begin{bmatrix} x_1 \\ y_1 \\ \vdots \\ x_N \\ y_N \end{bmatrix}$$

$$M_{affine} = \begin{bmatrix} a_1 & a_2 & a_3 \\ -a_2 & a_1 & a_4 \end{bmatrix}$$

The matching unit 47 converts a position $(targetx_m, targety_m)$ of the target parking position 30 in the map coordinate system, which is stored in the map data 46, to a position $(targetx, targety)$ in the vehicle coordinate system, using the following equation.

[Math 3]

$$\begin{Bmatrix} targetx \\ targety \end{Bmatrix} = M_{affine} \begin{Bmatrix} targetx_m \\ targety_m \\ 1 \end{Bmatrix}$$

When the target trajectory generation unit 48 receives a travel trajectory calculation command from the parking assist control unit 41, the target trajectory generation unit 48 calculates a target travel trajectory starting from the current position of the own vehicle 1 and reaching the target parking position 30 in the vehicle coordinate system and a target vehicle speed profile in accordance with which the own vehicle 1 travels the target travel trajectory. When the steering control unit 49 receives a steering control command from the parking assist control unit 41, the steering control unit 49 controls the steering actuator 18a in such a way that the own vehicle 1 travels along the target travel trajectory. When the vehicle speed control unit 50 receives a vehicle speed control command from the parking assist control unit 41, the vehicle speed control unit 50 controls the accelerator actuator 18b and the brake actuator 18c in such a way that vehicle speed of the own vehicle 1 changes in accordance with the target vehicle speed profile.

When the own vehicle 1 reaches the target parking position 30 and the parking assist control is completed, the parking assist control unit 41 causes a parking brake 17 to operate and switches the shift position to a parking range (P range).

(Operation)

Figure 10A:
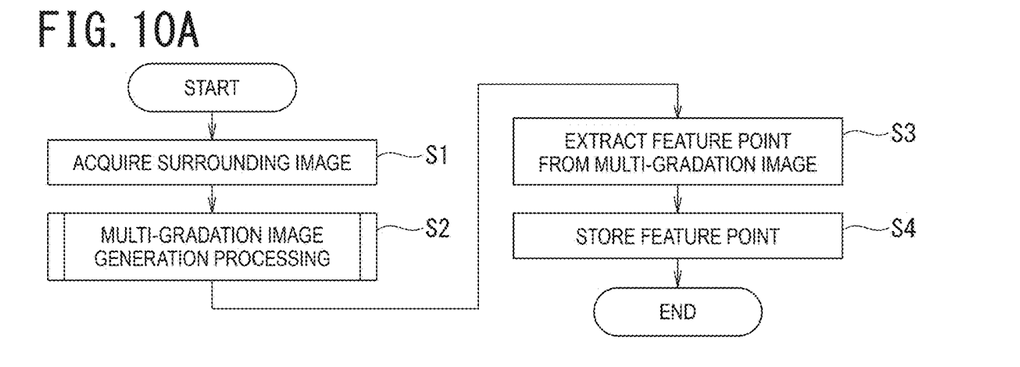
FIG. 10A is an explanatory diagram of a first example of processing of storing a learned feature point.

FIG. 10A is an explanatory diagram of an example of processing of storing a learned feature point in an environment in which the illuminance around the own vehicle 1 is greater than or equal to the predetermined threshold value.

In step S1, the image conversion unit 42 converts a captured image captured by the camera to an overhead image that is an image viewed from a virtual viewpoint directly above the own vehicle 1 and acquires a surrounding image. In step S2, the feature point detection unit 44 performs multi-gradation image generation processing.

Figure 10B:
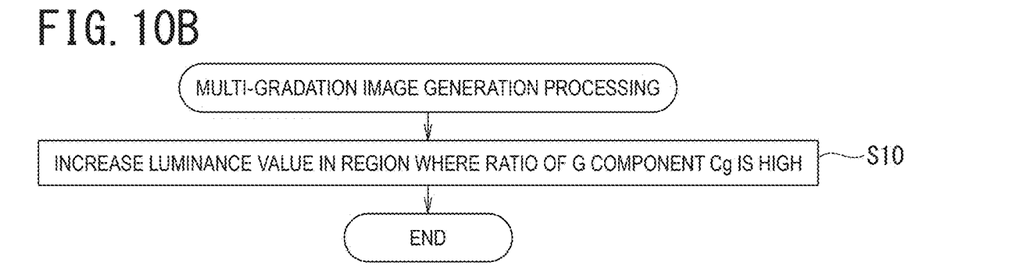
FIG. 10B is an explanatory diagram of a first example of multi-gradation image generation processing.

FIG. 10B is an explanatory diagram of a first example of the multi-gradation image generation processing. In step S10, the feature point detection unit 44 converts the surrounding image to a multi-gradation image in such a way that a luminance value in a region in which the ratio of the green component is high increases.

Figure 10C:
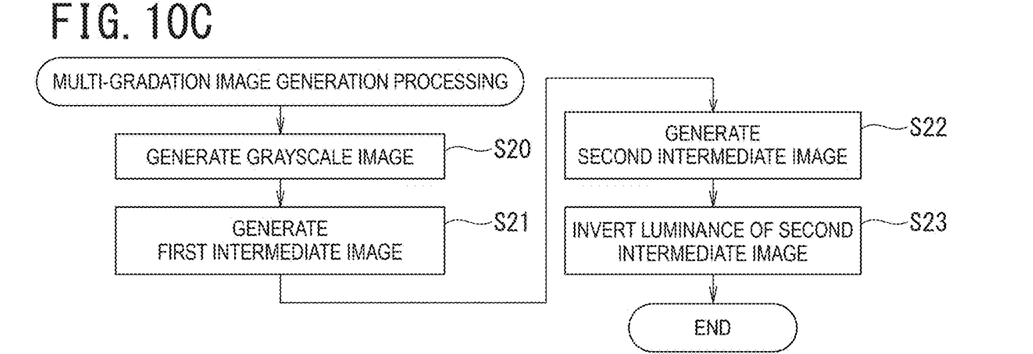
FIG. 10C is an explanatory diagram of a second example of the multi-gradation image generation processing.

FIG. 10C is an explanatory diagram of a second example of the multi-gradation image generation processing.

In step S20, the feature point detection unit 44 converts the surrounding image to an ordinary grayscale image. In step S21, the feature point detection unit 44 converts the surrounding image to a first intermediate image. In step S22, the feature point detection unit 44 generates a second intermediate image. In step S23, the feature point detection unit 44 generates a multi-gradation image by inverting luminance of the second intermediate image.

Figure 10D:
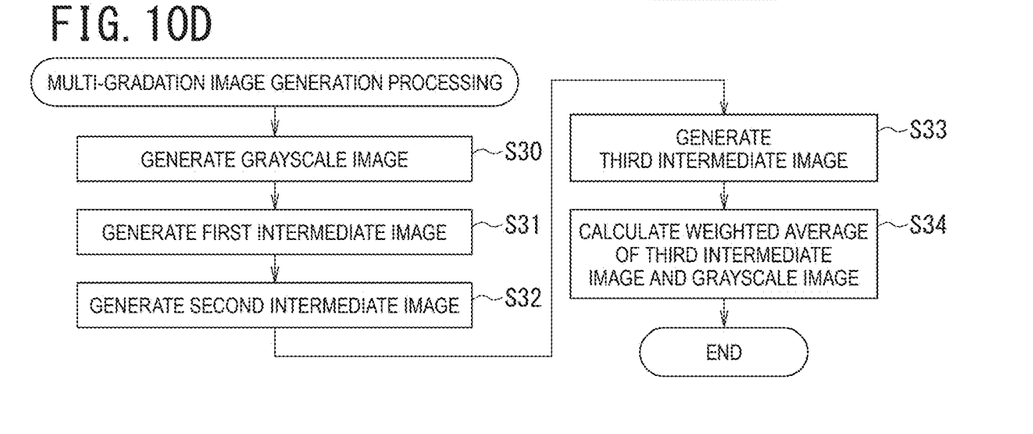
FIG. 10D is an explanatory diagram of a third example of the multi-gradation image generation processing.

FIG. 10D is an explanatory diagram of a third example of the multi-gradation image generation processing. Processing in steps S30 to S32 is the same as the processing in steps S20 to S22 in FIG. 10C. In step S33, the feature point detection unit 44 generates a third intermediate image by inverting luminance of the second intermediate image. In step S34, the feature point detection unit 44 generates a multi-gradation image by calculating a weighted average of the third intermediate image and the grayscale image.

FIG. 10A is now referred to. In step S3, the feature point detection unit 44 extracts a feature point from the multi-gradation image. In step S4, the feature point detection unit 44 stores the extracted feature point in the storage device 21 as a learned feature point.

Figure 10E:
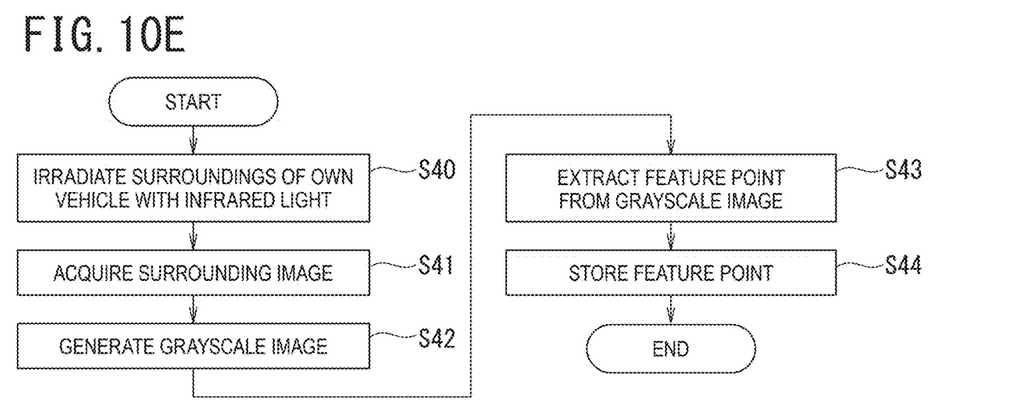
FIG. 10E is an explanatory diagram of a second example of the processing of storing a learned feature point.

FIG. 10E is an explanatory diagram of an example of processing of storing a learned feature point in an environment in which the illuminance around the own vehicle 1 is less than the predetermined threshold value.

In step S40, the controller 16 irradiates the surroundings of the own vehicle 1 with infrared light by the infrared projector 19. Processing in step S41 is the same as the processing in step S1 in FIG. 10A. In step S42, the feature point detection unit 44 converts the surrounding image to an ordinary grayscale image. In step S43, the feature point detection unit 44 extracts a feature point from the grayscale image. Processing in step S44 is the same as the processing in step S4 in FIG. 10A.

Figure 11A:
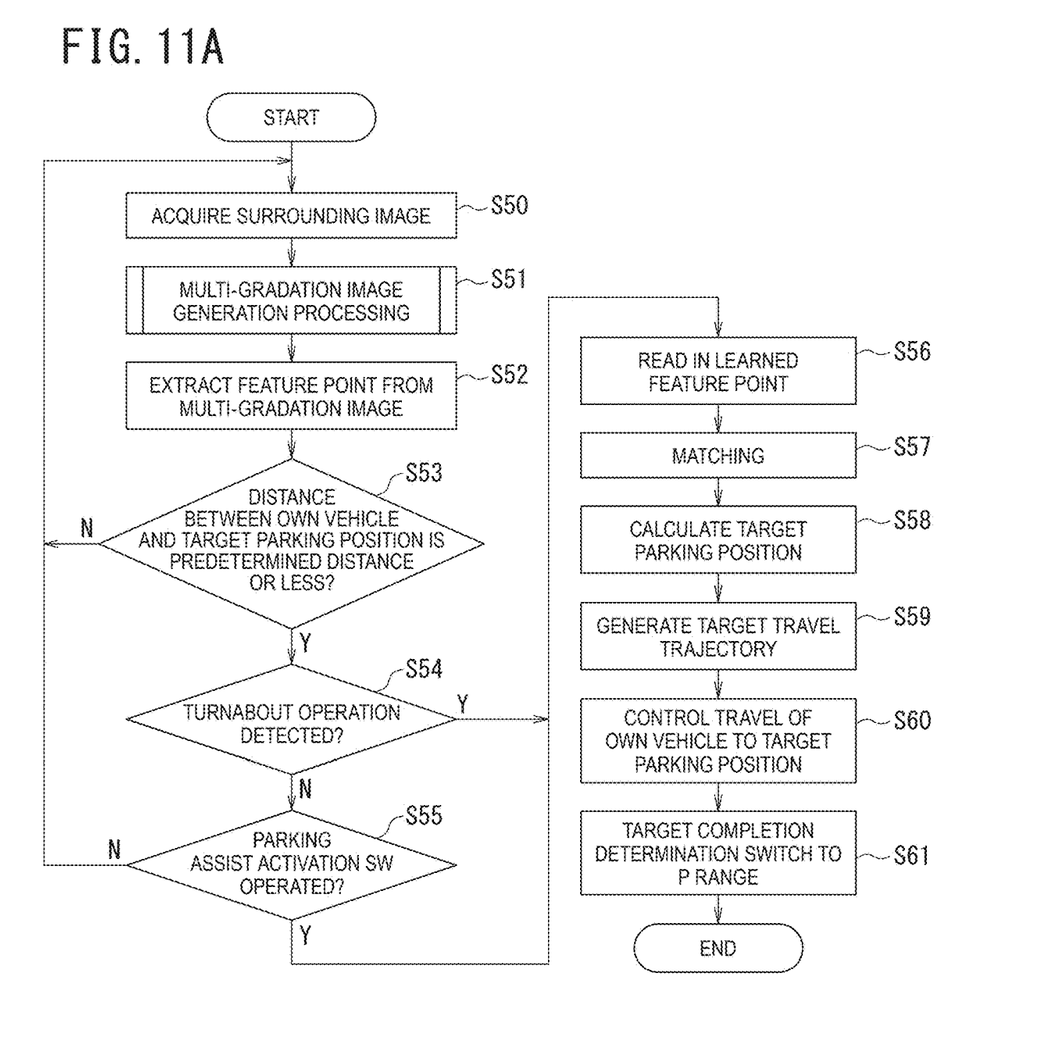
FIG. 11A is an explanatory diagram of a first example of processing performed when the parking assist is performed.

FIG. 11A is an explanatory diagram of an example of processing performed when the parking assist is performed in an environment in which the illuminance around the own vehicle 1 is greater than or equal to the predetermined threshold value. Processing in steps S50 and S51 is the same as the processing in steps S1 and S2 in FIG. 10A. In step S52, the feature point detection unit 44 extracts a surrounding feature point from the multi-gradation image. In step S53, the parking assist control unit 41 determines whether or not distance between the own vehicle 1 and the target parking position 30 is less than or equal to a predetermined distance. When the distance is less than or equal to the predetermined distance (step S53: Y), the process proceeds to step S54. When the distance is not less than or equal to the predetermined distance (step S53: N), the process returns to step S50. In step S54, the parking assist control unit 41 determines whether or not the parking assist control unit 41 has detected a shift operation for turnabout. When the parking assist control unit 41 detects the shift operation (step S54: Y), the process proceeds to step S56. When the parking assist control unit 41 has not detected the shift operation (step S54: N), the process proceeds to step S55. In step S55, the parking assist control unit 41 determines whether or not the parking assist activation SW has been operated by the driver. When the parking assist activation SW is operated (step S55: Y), the process proceeds to step S56. When the parking assist activation SW has not been operated (step S55: N), the process returns to step S50.

In step S56, the matching unit 47 reads in a learned feature point from the storage device 21. In step S57, the matching unit 47 matches a surrounding feature point with the learned feature point. In step S58, the matching unit 47 calculates a target parking position 30, based on feature points that match with each other. In step S59, the target trajectory generation unit 48 calculates a target travel trajectory and a target vehicle speed profile. In step S60, the steering control unit 49 and the vehicle speed control unit 50 control the steering actuator 18a, the accelerator actuator 18b, and the brake actuator 18c, based on the target travel trajectory and the target vehicle speed profile. In step S61, when the parking assist control is completed, the parking assist control unit 41 causes the parking brake 17 to operate and switches the shift position to the P range.

Figure 11B:
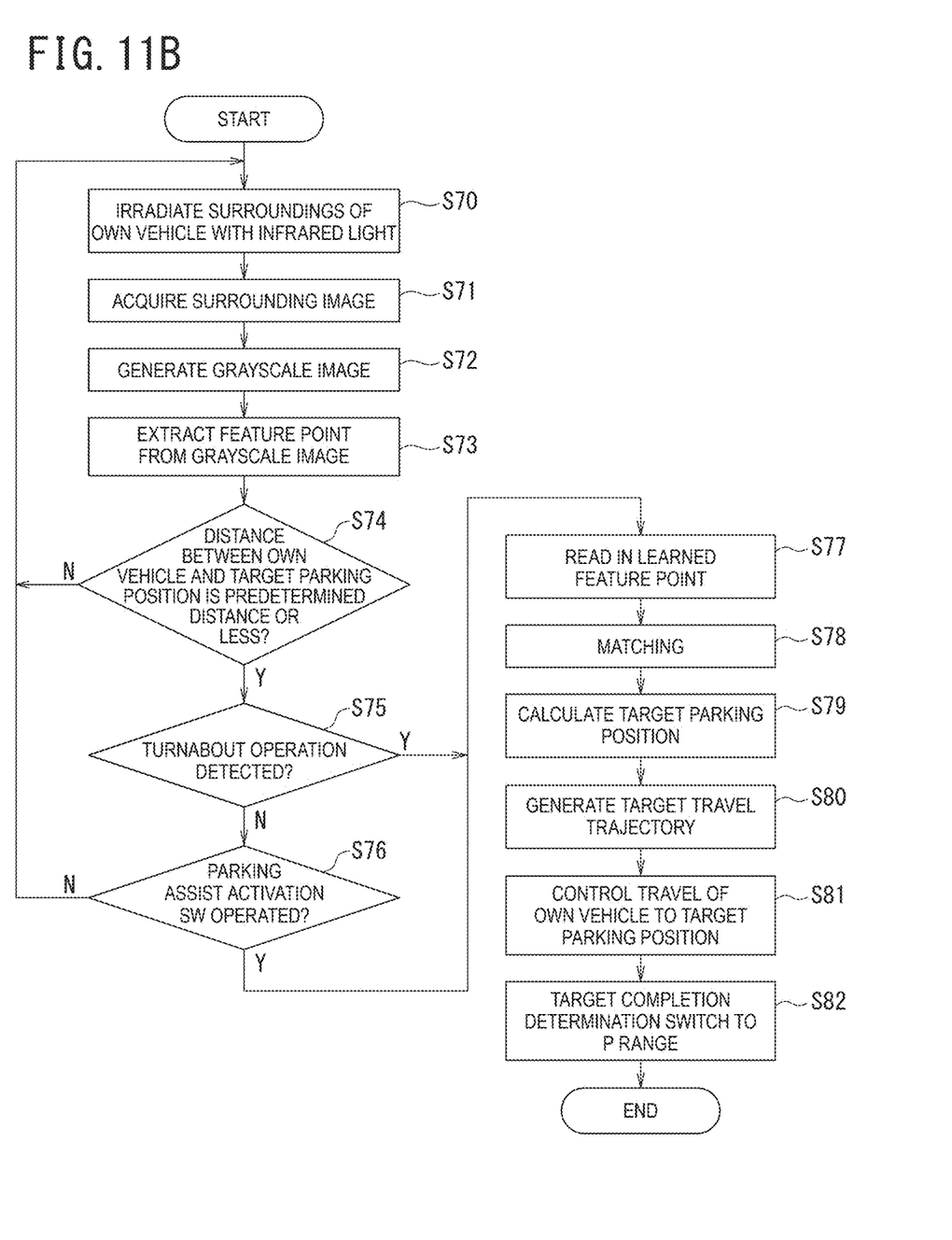
FIG. 11B is an explanatory diagram of a second example of the processing performed when the parking assist is performed.

FIG. 11B is an explanatory diagram of an example of processing performed when the parking assist is performed in an environment in which the illuminance around the own vehicle 1 is less than the predetermined threshold value.

Processing in steps S70 to S72 is the same as the processing in steps S40 to S42 in FIG. 10E. In step S73, the feature point detection unit 44 extracts a surrounding feature point from the grayscale image. Processing in steps S74 to S82 is the same as the processing in steps S53 to S61 in FIG. 11A.

ADVANTAGEOUS EFFECTS OF EMBODIMENT (1) In the parking assist method, when a target feature point that is at least one of a learned feature point and a surrounding feature point is to be extracted, a surrounding image that is a color image obtained by capturing the surroundings of the own vehicle 1 is converted to a first multi-gradation image in such a way that in the surrounding image, a luminance difference between a region in which the ratio of the green component is low and a region in which the ratio of the green component is high increases, and the target feature point is extracted from the first multi-gradation image. Since because of this configuration, an indistinct feature point is less likely to be extracted in a vegetation region, the calculation precision of the target parking position can be improved.

(2) One of a learned feature point and a surrounding feature point may be extracted from an image obtained by capturing the image when the surroundings of the own vehicle 1 is irradiated with infrared light, and the other of the learned feature point and the surrounding feature point may be extracted from the first multi-gradation image. Because of this configuration, even when one of the learned feature point and the surrounding feature point is extracted from an image captured with infrared light radiated and the other of the learned feature point and the surrounding feature point is extracted from an image captured without radiating infrared light, the calculation precision of the target parking position can be improved.

(3) The surrounding image may be converted to the first multi-gradation image in such a way that a luminance value in the vegetation region in the surrounding image increases as a region in which the ratio of the green component is high within the surrounding image. Since because of this configuration, an indistinct feature point is less likely to be extracted in the vegetation region, the calculation precision of the target parking position can be improved.

(4) The first multi-gradation image may be generated based on a ratio of at least two color components including the green component of the color components of the surrounding image that is a color image.

Because of this configuration, the first multi-gradation image can be generated in such a way that a luminance value in a region in which the ratio of the green component is high increases to a higher value than a luminance value in a region in which the ratio of the green component is low.

(5) A second multi-gradation image may be generated by applying grayscale conversion to the surrounding image, a first intermediate image that is a colorless multi-gradation image may be generated based on a ratio of at least two color components including the green component of the color components of the surrounding image that is a color image, a second intermediate image may be generated based on a luminance difference between the first intermediate image and the second multi-gradation image, and the first multi-gradation image may be generated by inverting luminance of the second intermediate image. Because of this configuration, the second intermediate image can be generated in such a way that a luminance difference in a region in which the ratio of the green component is low decreases.

(6) A third intermediate image may be generated by inverting the luminance of the second intermediate image, and the first multi-gradation image may be generated by calculating a weighted average of each pixel value in the third intermediate image and a corresponding pixel value in the second multi-gradation image. Because of this configuration, the first multi-gradation image can be generated in such a way that a luminance value in a region in which the ratio of the green component is high increases to a higher value than a luminance value in a region in which the ratio of the green component is low.

REFERENCE SIGNS LIST

1 Own vehicle
10 Driving assist device
16 Controller

The invention claimed is:

1. A parking assist method for assisting parking of an own vehicle at a target parking position, the parking assist method comprising:

extracting a feature point in surroundings of the target parking position from an image obtained by capturing surroundings of the own vehicle as a learned feature point and storing the learned feature point in a storage device, in advance;

acquiring an image by capturing surroundings of the own vehicle when causing the own vehicle to move to the target parking position;

extracting a feature point in surroundings of the own vehicle from an image of surroundings of the own vehicle as a surrounding feature point;

calculating a relative position of the own vehicle with respect to the target parking position, based on a relative positional relationship between the learned feature point and the target parking position and a relative positional relationship between the surrounding feature point and the own vehicle;

calculating a target travel trajectory starting from a current position of the own vehicle and reaching the target parking position, based on a relative position of the own vehicle with respect to the calculated target parking position and assisting the own vehicle in moving along the target travel trajectory; and when a target feature point, the target feature point being at least one the learned feature point and the surrounding feature point, is extracted:

converting a surrounding image, the surrounding image being a color image obtained by capturing surroundings of the own vehicle, to a first multi-gradation image in such a way that in the surrounding image, a luminance difference between a region in which a ratio of a green component is low and a region in which a ratio of a green component is high increases; and extracting the target feature point from the first multi-gradation image.

2. The parking assist method according to claim 1, further comprising extracting at least one of the learned feature point and the surrounding feature point from an image obtained by capturing the image when surroundings of the own vehicle are irradiated with infrared light and extracts another of the learned feature point and the surrounding feature point from the first multi-gradation image.

3. The parking assist method according to claim 1, further comprising converting the surrounding image to the first multi-gradation image in such a way that a luminance value in a vegetation region in the surrounding image increases as a region in which a ratio of a green component is high within the surrounding image.

4. The parking assist method according to claim 1, further comprising generating the first multi-gradation image, based on a ratio of at least two color components including a green component of respective color components of the surrounding image, the surrounding image being a color image.

5. The parking assist method according to claim 1, further comprising:

generating a second multi-gradation image by applying grayscale conversion to the surrounding image;

generating a first intermediate image, the first intermediate image being a colorless multi-gradation image, based on a ratio of at least two color components including a green component of respective color components of the surrounding image, the surrounding image being a color image;

generating a second intermediate image, based on a luminance difference between the first intermediate image and the second multi-gradation image; and generating the first multi-gradation image by inverting luminance of the second intermediate image.

6. The parking assist method according to claim 1, further comprising:

generating a second multi-gradation image by applying grayscale conversion to the surrounding image;

generating a first intermediate image, the first intermediate image being a colorless multi-gradation image, based on a ratio of at least two color components including a green component of respective color components of the surrounding image, the surrounding image being a color image;

generating a second intermediate image, based on a luminance difference between the first intermediate image and the second multi-gradation image;

generating a third intermediate image by inverting luminance of the second intermediate image; and generating the first multi-gradation image by calculating a weighted average of each pixel value in the third intermediate image and a corresponding pixel value in the second multi-gradation image.

7. A parking assist device comprising:

an image capturing device configured to capture surroundings of an own vehicle;

a storage device; and a controller configured to:

extract a feature point in surroundings of a target parking position from an image obtained by capturing surroundings of the own vehicle as a learned feature point and store the learned feature point in a storage device, in advance;

acquire an image by capturing surroundings of the own vehicle when causing the own vehicle to move to the target parking position;

extract a feature point in surroundings of the own vehicle from an image of surroundings of the own vehicle as a surrounding feature point;

calculate a relative position of the own vehicle with respect to the target parking position, based on a relative positional relationship between the learned feature point and the target parking position and a relative positional relationship between the surrounding feature point and the own vehicle;

calculate a target travel trajectory starting from a current position of the own vehicle and reaching the target parking position, based on a relative position of the own vehicle with respect to the calculated target parking position; and     assist the own vehicle in moving along the target travel trajectory, wherein when the controller extracts a target feature point, the target feature point being at least one of the learned feature point and the surrounding feature point, the controller:

converts a surrounding image, the surrounding image being a color image obtained by capturing surroundings of the own vehicle, to a first multi-gradation image in such a way that in the surrounding image, a luminance difference between a region in which a ratio of a green component is low and a region in which a ratio of a green component is high increases, and     extracts the target feature point from the first multi-gradation image.

\* \* \* \* \*